(12) United States Patent
Whittles

(10) Patent No.: US 6,446,575 B1
(45) Date of Patent: Sep. 10, 2002

(54) BIRD FEEDER

(75) Inventor: Christopher John Whittles, Shrewsbury (GB)

(73) Assignee: C J Wildbird Foods Limited, Shrewsbury (GB)

( * ) Notice: Subject to any disclaimer, the term of this patent is extended or adjusted under 35 U.S.C. 154(b) by 0 days.

(21) Appl. No.: 09/482,073

(22) Filed: Jan. 13, 2000

(30) Foreign Application Priority Data

Jan. 13, 1999 (GB) .............................................. 9900604

(51) Int. Cl.[7] .............................................. A01K 61/02
(52) U.S. Cl. ..................... 119/57.8; 119/52.2
(58) Field of Search .............. 119/52.2, 52.3, 119/57.8, 57.9

(56) References Cited

U.S. PATENT DOCUMENTS

| 5,150,665 A | 9/1992 | Boaz | 119/52.3 |
| 5,235,935 A | 8/1993 | Edwards | 119/57.8 |
| 5,305,709 A | 4/1994 | Hong | 119/57.8 |
| 5,452,682 A | 9/1995 | Bescherer et al. | 119/57.8 |
| 5,479,881 A | * 1/1996 | Lush | 119/57.8 |
| 5,642,689 A | 7/1997 | Harvey | 119/57.8 |
| 5,823,135 A | 10/1998 | Gilchrist et al. | 119/52.2 |
| 5,829,382 A | * 11/1998 | Garrison | 119/52.2 |
| 6,073,582 A | * 6/2000 | Lush | 119/52.3 |

FOREIGN PATENT DOCUMENTS

| GB | 2146220 | * 4/1985 | 119/52.2 |
| NL | 277459 | * 11/1964 | 119/52.2 |

* cited by examiner

Primary Examiner—Charles T. Jordan
Assistant Examiner—Elizabeth Shaw
(74) Attorney, Agent, or Firm—Burns, Doane, Swecker, Mathis L.L.P.

(57) ABSTRACT

A bird feeder comprising a body for housing bird seed and a perch or perches for a bird, attached to the body, each perch having at least one aperture in the body proximal to said perch wherein the aperture is above and offset to one side or the other of said perch.

28 Claims, 1 Drawing Sheet

BIRD FEEDER

TECHNICAL FIELD

The invention relates to a bird feeder and in particular a feeder for niger seed and other seeds for small birds such as Goldfinches.

BACKGROUND ART

It is known to provide a bird feeder for feeding niger seeds to Goldfinches which feeder comprises a body for housing the bird seed, a perch attached to the body and a slot positioned approximately 1 inch (2.54 cm) directly above the perch, wherein the slot is approximately 2 mm wide by 10 mm long.

This type of feeder is only found to be suitable for Goldfinches and is not thought to be particularly attractive to other types of small bird.

An object of the invention is to provide an improved bird feeder for small birds. An object of the invention is to provide a bird feeder being more attractive to and easier to use for Goldfinches, Tits and other small birds.

DISCLOSURE OF INVENTION

According to a first aspect of the invention there is provided a bird feeder comprising a body for housing bird seed, a perch for a bird, attached to the body, and an aperture in the body proximal the perch to allow access to the feed wherein the aperture is above and offset to one side of the perch Another aspect of the invention provides a bird feeder comprising a body for housing bird seed, a perch for a bird and an aperture in the body proximal the perch to allow access to the feed, wherein the aperture is substantially circular. In this arrangement the aperture can be directly above the perch. perch to allow access to the feed, wherein the aperture is above and offset to one side of the perch. An aperture can be positioned on either or both sides.

Preferably the centre of the or both aperture(s) is/are offset or displaced a distance (S) greater than 0 from the centre line of the perch and preferably greater than 5 mm and/or the radius of the aperture. Preferably the offset (S) is less than or approximately equal to 50 mm, more preferably less than or approximately equal to 25 mm and more preferably still within the range of 10–20 mm. The preferred form of offset (S) is approximately 13 mm.

Preferably the centre of the aperture is a distance (H) above the top of the perch which distance (H) is preferably greater than 30 mm. More preferably, the distance (H) is less than or approximately equal to 70 mm, more preferably still within the range of 40–60 mm, and still more preferably between 45 and 55 mm. In a preferred form, the distance (H) is approximately 50 mm.

Preferably, the diameter of the aperture is approximately 4 mm. Preferably the diameter of the perch is approximately 4 mm.

In a preferred form a plurality of perches and associated apertures are provided in a single bird feeder. More preferably, the perches lie on a spiral line about the body of the bird feeder which is preferably cylindrical. Also the apertures can lie on a spiral line preferably parallel to the line of perches. An aperture can be placed on either or both sides of the perch. In one form the offset distance (S) is the same for both apertures. In another form one aperture is offset more than the other, preferably the difference is offset between 5 and 20 mm and more preferably in the order of 10 mm.

In another form the diagonal separation (R) between the perch and the aperture is in the order of 40 to 60 mm and more preferably about 50 mm.

BRIEF DESCRIPTION OF DRAWINGS

An embodiment of the invention will now be described, by way of example only, with reference to the accompanying drawings, in which.

DETAILED DESCRIPTION OF INVENTION

Figure 1:
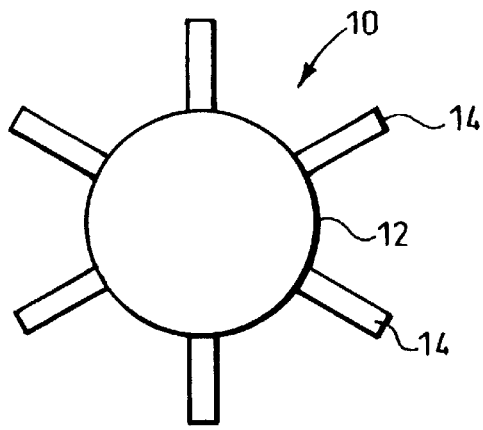
FIG. 1 is a schematic plan view of a bird feeder according to the invention.
Figure 2:
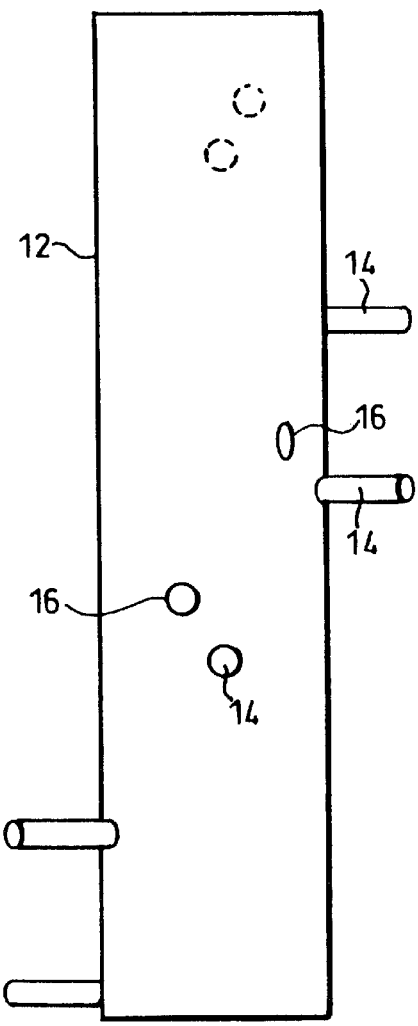
FIG. 2 is a schematic side elevation view of the feeder shown in FIG. 1.

Referring to the drawings, there is shown a bird feeder 10 according to the invention comprising a substantially cylindrical body 12 for housing bird feed such as niger or thistle seed. In this embodiment six perches 14 are attached to tubular body 12 in a spiral arrangement. Associated with each perch 14 is an aperture 16 in body 12 allowing access for a bird to seed contained within the bird feeder.

Figure 3:
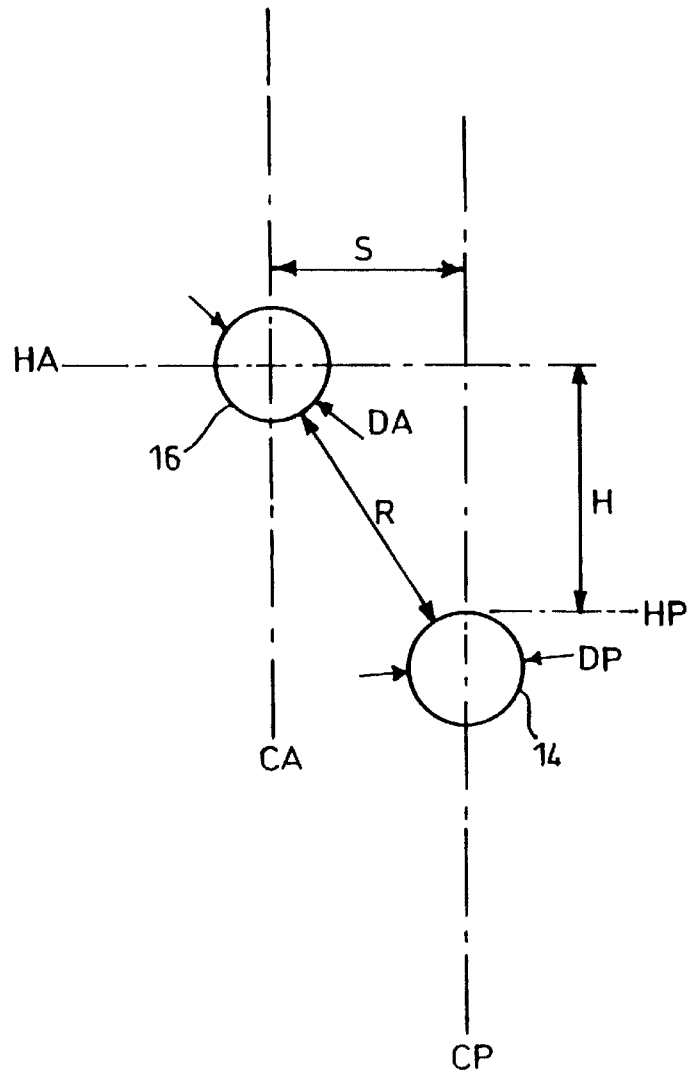
FIG. 3 is a schematic enlarged view of a perch and aperture on the feeder shown in FIGS. 1 and 2.

Referring to FIG. 3, it can be seen that aperture 16 is displaced to the side of perch 14. The extent of offset S can be defined as the separation between the vertical centre lines CA and CP passing through the aperture and perch respectively. Additionally, it can be seen that the aperture 16 is positioned a distance or height H above the top of perch 14. This separation can be defined by height H as being that between the horizontal centre line HA through aperture 16 and parallel line HP the top of perch 14. Referring to FIG. 3 it can also be seen that the perch and aperture can be defined as having diameters DP and DA respectively, which are separated by a distance R.

In a preferred form, the side ways offset S is in the order of 10–20 mm and more preferably approximately 13 mm. The offset S can be to either or both sides of the perch 14.

In a preferred form, the height separation H between perch 14 and aperture 16 is within the range 45–55 mm and more preferably about 50 mm.

However, the following arrangements are also possible:

S>0, S>5 mm, S<50 mm, S<25 mm, 10 mm<S<20 mm, S–13 mm and/or S>DA/2

H>30 mm, H<70 mm, 40 mm>H<60 mm, 45 mm>H<55 mm,

H–50 mm;

30>R<70, 40>R<60, 45 R>R<55, R–50mm;

2 mm>DP<6 mm, DP–4 mm; and/or 2 mm>DA<6 mm, DA–4mm

What is claimed is:

1. A bird feeder comprising a body for housing bird feed, a perch for a bird attached to the body, and an aperture in the body proximal the perch to allow unobstructed access directly to the feed housed within the body, wherein the aperture is above and offset to one side of the perch.

2. A bird feeder according to claim 1 comprising two apertures proximal the perch one offset on each side of the perch.

3. A bird feeder according to claim 2 wherein each of the two apertures is offset from the perch by a different distance.

4. A bird feeder according to claim 3 wherein the difference in offset is between 5 and 20 mm.

5. A bird feeder according to claim 4 wherein the difference in offset is in the order of 10 mm.

6. A bird feeder according to claim 1 comprising a plurality of perches each having an associated proximal aperture or apertures.

7. A bird feeder according to claim 6 wherein at least some of the plurality of perches lie on a spiral line.

8. A bird feeder according to claim 6 wherein at least some of the plurality of the perches lie on a spiral line about the body of the bird feeder.

9. A bird feeder according to claim 6 wherein at least some of the plurality of the perches lie on a spiral line parallel to a line of associated apertures.

10. A bird feeder according to claim 6 wherein at least one of said perches has two apertures proximal the perch one offset on each side of the perch.

11. A bird feeder according to claim 6 wherein at least one of said perches has two apertures offset from the perch by a different distance.

12. A bird feeder according to claim 1 wherein the perch is substantially cylindrical in shape.

13. A bird feeder according to claim 10 wherein the diameter of the perch (DP) is approximately 4 mm.

14. A bird feeder according to claim 1 wherein the body for housing bird seed is substantially cylindrical.

15. A bird feeder according to claim 1 wherein the aperture is substantially circular.

16. A bird feeder according to claim 15 wherein the diameter of the aperture (DA) is approximately 4 mm.

17. A bird feeder according to claim 1 wherein the aperture is offset to one side of the perch by a distance (S) is in the order of 5–50 mm.

18. A bird feeder according to claim 1 wherein the aperture is offset to one side of the perch by a distance (S) is in the order of 10–20 mm.

19. A bird feeder according to claim 1 wherein the aperture is offset to one side of the perch by a distance (S) is in the order of 13 mm.

20. A bird feeder according to claim 1 wherein the vertical distance between the aperture and the perch (H) is in the order of 30–70 mm.

21. A bird feeder according to claim 1 wherein the vertical distance between the aperture and the perch (H) is in the order of 40–60 mm.

22. A bird feeder according to claim 1 wherein the vertical distance between the aperture and the perch (H) is in the order of 45–55 mm.

23. A bird feeder according to claim 1 wherein the vertical distance between the aperture and the perch (H) is in the order of 50 mm.

24. A bird feeder according to claim 1 wherein the diagonal separation between the aperture and the perch (R) is in the order of 40 to 60 mm.

25. A bird feeder comprising:
a body for housing bird seed,
a plurality of perches for a bird attached to the body, each of said perches having an associated aperture in the body proximal the perch to allow access to the feed wherein the aperture is substantially circular; and
wherein at least some of the plurality of perches lie on a spiral line.

26. A bird feeder according to claim 25 wherein the diameter of the aperture is approximately 4 mm.

27. A bird feeder according to claim 25 wherein the perch is substantially cylindrical in shape.

28. A bird feeder according to claim 27 wherein the diameter of the perch is approximately 4 mm.

* * * * *